J. H. Owen.
Harvester Cutter.
No. 89,236.
Patented April 20, 1869.
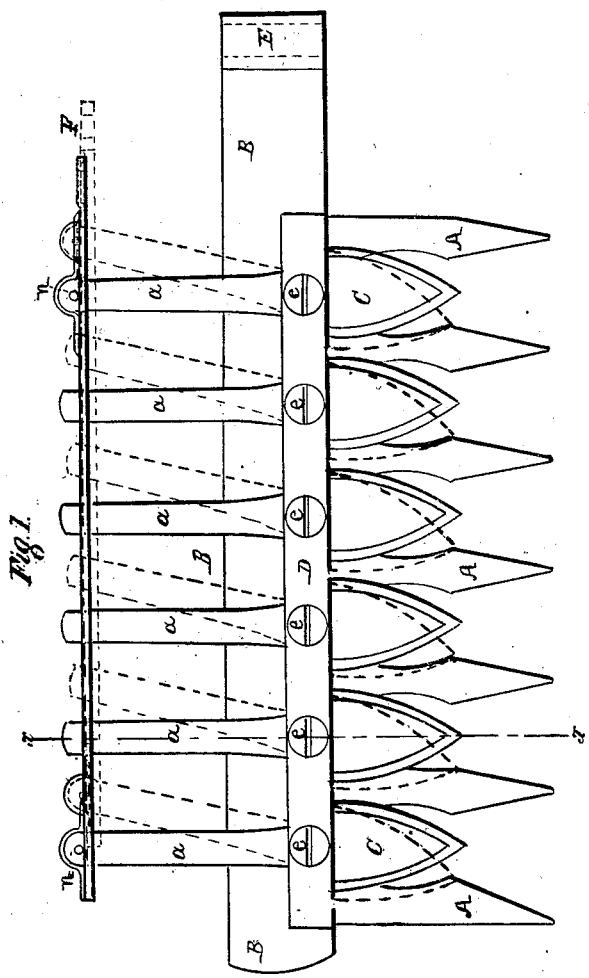
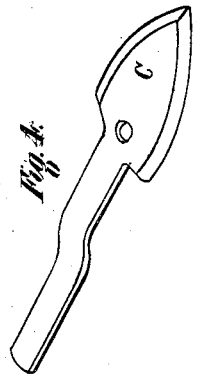
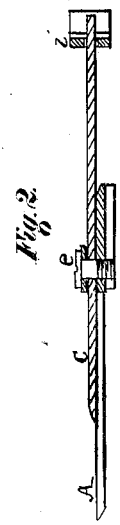
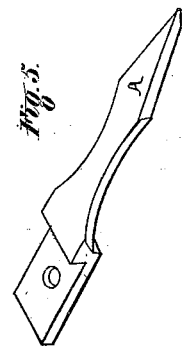
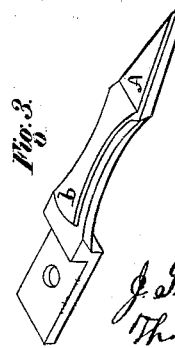
Inventor:
John H. Owen
By his atty: A. H. & R. K. Evans
Witnesses:
J. Snowden Bell
Thos. T. Everett

UNITED STATES PATENT OFFICE.

JOHN H. OWEN, OF HOUSTON TOWNSHIP, ADAMS COUNTY, ILLINOIS.

IMPROVEMENT IN HARVESTER-CUTTERS.

Specification forming part of Letters Patent No. 89,236, dated April 20, 1869.

*To all whom it may concern:*

Be it known that I, JOHN H. OWEN, of Houston township, in the county of Adams and State of Illinois, have invented a new and useful Improvement on a Lever-Sickle, of which the following is a full, clear, and exact description, reference being had to the accompanying drawings, making part of this specification, in which—

Figure I is a top view; Fig. II, a sectional view on the line $x\,x$ of Fig. I. Fig. III is a tooth provided with a guard. Fig. IV is a knife with a bent shank, in order to allow the attachment of a grain-platform. Fig. V is an ordinary tooth without the guard.

My invention has for its object to provide a means for cutting more easily grain, grass, hedge-brush, or briers; and consists of a series of convex knives provided with levers working against and over teeth having concave sharpened edges.

To enable others skilled in the art to understand and use my invention, I will proceed to describe the manner in which I have carried it out.

In the said drawings, A A are pointed teeth with concave sharpened edges riveted to the bar B. C C are knives with convex edges, pivoted at $e\,e\,e$ between the bars B and D, and working against and over the teeth A A.

The shanks $a\,a\,a$ of the knives C C C are run through slots in the lever-bar $i\,i$, the shanks of the knives at the ends of the series having pins $n\,n$ through their extremities to hold the lever-bar in place.

The eye E in the main bar B forms the hinge-joint, and the eye F in the lever-bar $i\,i$ is for the reception of the crank-shaft or driving-rod.

The lever-bar $i\,i$ has a lateral motion allowed by the pivots $e\,e$, which alternates the position of the knives C C from left to right or from right to left, as shown by the red lines in Fig. I.

The teeth A A may be made with a guard, $b$, Fig. III, to be used in cutting grass or grain.

The shanks of the knives C C may be made curved, as in Fig. IV, in order to allow the attachment of a grain-platform on a level with the main sickle-bar B. The shanks of the knives can also be covered with a sheet-iron strip to prevent the cut grain from falling between them and interfering with the action of the lever-bar.

The advantage of my improvement over sickles now in use is the leverage gained by the shanks $a\,a$ of the knives, the durability of the sickle, owing to the ease with which the teeth and knives may be removed for repair and sharpening, and the peculiar formation of the cutting-edges of the knives and teeth, which readily admit the grain, &c., and hold it until cut.

I am aware that double-convex knives have been used, and also double-concave teeth, and therefore do not broadly claim either; but What I do claim as my invention, and desire to secure by Letters Patent, is—

The combination of the teeth A A, constructed with double-concave cutting-edges, in combination with the double-convex knives C C, when the said knives are worked by a lever, and all constructed and arranged substantially as and for the purpose described.

J. H. OWEN.

Witnesses:
A. M. BYERS,
A. OWEN, JR.